United States Patent [19]
Johnson et al.

[11] Patent Number: 4,874,585
[45] Date of Patent: Oct. 17, 1989

[54] ECONOMIC RECOVERY AND UTILIZATION OF BOILER FLUE GAS POLLUTANTS

[75] Inventors: Arthur F. Johnson, Boulder, Colo.; Robert L. Sackett, Los Angeles, Calif.

[73] Assignee: RCM Industries Corporation, Los Angeles, Calif.

[21] Appl. No.: 165,312

[22] Filed: Mar. 8, 1988

[51] Int. Cl.$^4$ .............................................. B01J 8/12
[52] U.S. Cl. ...................................... 422/171; 55/390; 55/479; 422/173; 422/214; 422/219; 422/216
[58] Field of Search ............... 422/171, 173, 176, 177, 422/214, 216, 219; 55/390, 479

[56] References Cited

U.S. PATENT DOCUMENTS

| | | | |
|---|---|---|---|
| 3,228,755 | 1/1966 | Lottinrille | 422/171 |
| 3,770,388 | 11/1973 | Zenz | 422/223 |
| 4,254,558 | 3/1981 | Mayer | 422/216 |
| 4,436,701 | 3/1984 | Richter | 55/390 |
| 4,451,435 | 5/1984 | Holter et al. | 422/171 |
| 4,629,480 | 12/1986 | Morgraf | 55/479 |
| 4,725,290 | 2/1988 | Ohlmeyer et al. | 55/479 |

Primary Examiner—Michael S. Marcus
Attorney, Agent, or Firm—Pennie & Edmonds

[57] ABSTRACT

Improved methods and apparatus for removing unwanted pollutants from flue gases are disclosed. A sequence of at least three vertical beds of particulates is disposed in the flue gas exhaust duct. A first bed comprises boiler ash or sand. Lime in the fly ash and sulfuric acid and water in the flue gas react with the particulates to form gypsum, removing the fly ash from the flue gas. In the second bed, the remaining sulfuric acid is condensed and removed on a further bed of boiler ash. In the third bed, a catalyst, typically an activated aluminous particulate with an alkali coating thereon, provided by adding ammonia to the flue gas stream, condenses out the remaining sulphur dioxide, which can then be removed from the catalyst particles in a regenerative step. A scrubber embodying these principles is readily retrofittable to pre-existing power plants burning sulphur-containing coal.

33 Claims, No Drawings

ECONOMIC RECOVERY AND UTILIZATION OF BOILER FLUE GAS POLLUTANTS

FIELD OF THE INVENTION

This invention relates to the removal and economic utilization of noxious elements normally released to the atmosphere when fossil fuel, e.g., sulphur-bearing coal, is burned to make steam in boilers as in the electric utility industry.

BACKGROUND OF THE INVENTION

Many processes are in use for chemically combining the oxides of sulphur found in flue gases with purchased alkali or alkaline earth materials, which processes enormously increase the capital and operating costs of generating electric power and prevent American manufacturers from competing in world markets. The added costs escalate when the high sulphur coals found in the eastern United States are burned, as occurs to a significant extent in geographic regions where high power consuming industries are located, e.g., near the Ohio River and Mississippi River. Coal mined in the western United States is lower in sulphur content, but shipping it to the eastern United States is not economically feasible. Air pollution damage to the forests of New England and Canada has occasioned an international conference with Canada on sulphur-caused "acid rain" removal Health problems caused by air pollution have been known throughout the history of industrial development Hence improvement in economic removal of sulphur from flue gases is needed.

SUMMARY OF THE INVENTION

This invention discloses means and processes whereby coal containing 4% or more of sulphur may be burned in boiler plants very economically while as much as 99% of the sulphur in the flue gas is removed Nitrogen dioxide is also eliminated, and valuable by-products are produced; these may include concrete additives, liquid fertilizers or alternately liquid sulfuric acid or elemental sulphur as may best suit local market demands.

The invention is flexibly applied to coals of continuously varying analyses, is useful in connection with systems involving variable boiler steam rates, and is easily applied to gas-fired boilers. The invention is financially reasonable with respect to both capital and operating costs because it involves a substantially dry process for recovery of pollutants, and provides a relatively small and compact apparatus that can be retrofit to huge existing power plants.

The invention considers the principal contaminants of boiler flue gas to be fly ash, sulfuric acid fumes, and much smaller amounts of sulphur dioxide gas found when the former contaminants are removed. Nitrogen dioxide also present is also consumed.

This invention removes substantially all of these impurities by forcing every cubic inch of flue gas to pass successively through thin vertical beds of particles which successively entrain the fly ash, condense the sulfuric acid fumes and adsorb the remaining sulphur dioxide gas on a catalyst, from which sulphurous acid may be recovered by a vacuum leach process For example, in order to retrofit the flue gas purifier of the invention to a preexisting power plant, a duct section as short as 10 or 15 feet in length is inserted in the conventional cylindrical duct which carries boiler flue gas to a smoke stack. The new section according to this invention comprises two or more, typically three, vertical beds of particulate matter, arranged such that all of the flue gas must pass in succession through each of the three beds.

Water tubes control the temperatures of the three beds, and support and space screens supporting the particulates. In the first vertical bed, the flue gas is cleaned of fly ash by chemical combination with the material of the bed. In the second vertical bed of particles, sulfuric acid fumes in the flue gas are made to condense This is done by controlling the bed temperature to a fume condensation temperature. In the third vertical bed, the particulates comprise a catalyst, chosen for its ability to adsorb $SO_2$. For example, an activated aluminous catalyst which may be coated with an alkali solution and dried may be used. Preferably, the alkali is ammonia introduced as a gas in the flue gas upstream of this bed, where it instantaneously combines with any sulphur dioxide yet remaining in the flue gas. The reaction is catalyzed by the aluminous particulates of the bed, from which sulphates and sulphites can then easily be vacuum leached. Other catalysts may be employed as well.

According to an important aspect of this invention, the flue gas travels through the beds at high velocities. This removes the boundary layer of gas from the particulates of the beds, such that very high reaction rates are achieved. By comparison, in conventional flue gas cleaning, the particles used for sorption are normally widely spaced in the gas, so that reactors of enormous size are needed.

The spaced beds are preferably of novel construction comprising inclined titanium or stainless steel "louvers" on the upstream side, on which the particulates rest, and a fine stainless steel screen on the downstream side, to contain the particles in a slightly fluidized but compacted state. Particles are fed continuously to the top of each bed and are withdrawn, loaded with flue gas contaminants, at the bottom of each bed.

In the first upstream bed the preferred particulates are coarse sand or crushed and sized bottom-ash slag from the boiler, which entrain fly ash. Lime in the fly ash reacts with the sulfuric acid fumes, which begin to condense with one molecule of water at 554 degrees F. and with two molecules of water at 332 degrees F. This forms gypsum which can be used to make concrete.

In the second bed, downstream from the first, the preferred particulates are the same as in the first bed, but since only a limited amount of the lime is carried over from the first bed, and because the temperature in this second bed is lower, it is possible to condense sulfuric acid. At the base of this second bed, particulates are continuously withdrawn and leached with a minimum amount of water to obtain concentrated sulfuric acid. An acid-resistant vacuum drum filter permits a minimum amount of leach water to be used.

In the third bed, the particulates are preferably an activated aluminous catalyst wetted with an alkali and dried before use. It is well known that sulphur dioxide will react with the alkali to form bisulphites and bisulphates. According to this invention, the aluminous particulates are continuously withdrawn at the base of the bed and are leached with water on a vacuum drum filter Sulphur dioxide gas is then withdrawn, which may be discharged into the flue gas stream ahead of the first or second bed to form respectively gypsum or sulfuric acid.

The preferred alkali in this process step is ammonia gas, fed into the flue gas up-stream of the third bed. Ammonia reacts instantaneously with the sulphur dioxide to form ammonium bisulphites or bisulphates on the activated aluminous catalyst, which is then leached in a vacuum filter to recover the sulphur dioxide. Since the sulphur dioxide is much more volatile than the ammonia, the latter remains in the particulates to be used again Only enough ammonia for makeup, i.e., to replace losses, is required.

In the prior art, use of water solutions of ammonia used to spray-wash flue gases always resulted in a visible plume of pollutants above the smoke stack. This has not been observed to date in the practice of this invention, which treats the flue gas with more or less dry particulates, since the moisture is sorbed thereon.

The recovered sulphurous acid can be made into liquid sulphur dioxide by conventional distillation, cooling and compression steps, and can then be converted to elemental sulphur by the Claus process, but such byproducts do not appear to be cost-effective and so are not presently part of the preferred practice of this invention.

In contrast with known processes for flue gas treatment that first use water sprays on the flue gas to greatly cool it and then reheat it to ensure sufficient stack draft, flue gas as treated in the practice of this invention needs no reheating before exit to the smoke stack.

Passage of the flue gas through the three beds of particulates as described herein involves a pressure drop of about 30 inches of water at a flue gas velocity of 40 feet per second. An additional fan will not be required to motivate this gas flow because the frictional loss causing the 30 inches of water pressure drop is, by the law of conservation of energy, turned into an increase in temperature of the flue gases, which gives them more "draft" in the stack.

At the same time boiler feedwater can be used to cool the baffles and screen, and thus the beds, to insure sulfuric acid formation and condensation. This will recover heat in the flue gases not currently being recovered, because the cost of corrosion-proofing such apparatus typically exceeds that of the heat energy saved.

BRIEF DESCRIPTION OF THE DRAWINGS

The invention will be understood if reference is made to the accompanying drawings, in which:

FIG. 1 is a flow sheet of the preferred process according to the invention.

FIG. 2 is a horizontal cross-section through a rectangular flue gas duct, connected in a conventional cylindrical duct, and housing three filter beds.

FIG. 3 is a enlarged portion of FIG. 2 showing a cross-section through a portion of a vertical, flue gas filter bed.

FIG. 4 is a horizontal cross-section through a vertical flue gas filter assembly.

FIG. 5 is a perspective view at the base of the filter bed of FIG. 3, showing the method of particulate withdrawal.

FIG. 6 is a vertical cross-section through a vertical pipe and the end of one of the particulate beds; the particles are vacuum lifted from the bottom to the top of the bed through the pipe.

FIG. 7 is a perspective view of one of the beds, showing a rotary drum employed to filter acids from particulates.

FIG. 8 is a plan view of two of the filter beds of FIG. 2 showing details of their piping connections.

DESCRIPTION OF THE PREFERRED EMBODIMENT

FIG. 1 shows a flow sheet of a preferred process according to the invention. The process begins at 100, wherein flue gases are indicated passing through a conventional horizontal duct of circular cross-section. It is convenient to fabricate the flue gas treatment apparatus of the invention to be of square cross-section; where a retrofit installation is envisioned, a funnel-shaped gas flow distributor is provided as indicated at 102 to match a horizontal flue gas duct typically of circular cross-section with the square treatment duct according to the invention.

As indicated at 104, the flue gases entering this rectangular duct chiefly comprise $N_2 + CO_2 + H_2O + O_2 + SO_2 + NO_x$. Accordingly to the invention, these flue gases first encounter a first vertical bed 106 of particulates. Preferably these particulates are bottom ash removed from the boiler after combustion of coal which has been crushed and sized accordingly, e.g., to approximately 10-80 mesh. Sand can also be used. Lime in the fly ash in the flue gases reacts with $SO_2$ and water in the flue gas to form gypsum. The gypsum can be recovered from the particulate bed 106 in a manner discussed below and used for example as a constituent of concrete or in fertilizer. Gypsum is thus a valuable byproduct of the process of the invention.

The structure of the vertical beds is detailed below in connection with FIGS. 2 through 4; briefly, each bed comprises means for supporting a quantity of the particulates in a vertically extending layer disposed transverse to the flue gas stream, such that the entire volume of flue gas must pass through each bed and be reacted thereon. Each bed is supported at least in part by cooling water pipes which also control its temperature.

According to an important aspect of the invention, conditions are maintained in at least one of these beds which encourage sulfuric acid to be formed therein. This is in distinct contradistinction to the typical practices of the prior art of flue gas treatment, which was to keep the flue gas temperature high enough that the sulfuric acid did not condense. While this practice limited corrosion of the flue gas stack assembly, thus benefiting the utility operator, it meant that the sulfuric acid condensed later in the atmosphere, as a principal cause of acid rain, which is a very serious pollutant throughout much of North America and Western Europe.

Patents are known which suggest deliberate condensation of sulfuric acid to remove it from flue gases; see U.S. Pat. Nos. 4,597,433, 4,676,299, and U.S. Pat. No. 4,703,794, all issued to one of the applicants herein After passage of the flue gases through the first bed 106 and removal of the fly ash, the flue gases then pass through a second bed of particulates, as indicated at 108. The particulates in the second bed are essentially similar to those in the first bed. However, in this case the lime ha been principally removed and the temperature is relatively lower, such that it is possible to condense sulfuric acid out in this bed. Again, as indicated, cooling water pipes are provided and are used to control the temperature of the beds such that the sulfuric acid does in fact condense and is removed. Preferably the sulfuric acid is removed from the particulates by a vacuum filter, the structure of which is detailed in connection with FIGS. 5–7.

In the third bed, indicated at 110, the particulate is preferably an activated aluminous catalyst, that is, an alumina-bearing material wetted with an alkali and dried before use. Any remaining sulphur dioxide in the flue gas stream will react with the alkali to form bisulphites and bisulphates. Nitrous oxides ($NO_x$) are also removed in this step. The bisulphates are leached from the catalyst in a vacuum filter apparatus, again discussed in connection with FIGS. 5–7 below, removing the sulphur dioxide therefrom. This can be returned to the flue gas stream prior to the first bed for reaction to form gypsum and sulfuric acid, all as discussed above. The aluminous catalyst particles can then be recirculated as indicated at 112; typically the alkali will remain thereon and is similarly reused. The preferred alkali is ammonia introduced into the flue gas stream between the second and third beds.

Other catalysts may be employed to condense the $SO_2$, with or without the alkali addition. These could include such high surface area materials as activated charcoal or other carbonaceous material, diatomaceous earth, clay, Fuller's earth, or activated silica materials each as silica gel. Polar or non-polar materials may be useful.

The flue gas stream having thus had the $SO_2$ and nitrous oxides removed therefrom is then returned to the conventional duct at 114 by means of an intermediate funnel shaped flow distributor indicated at 116.

FIG. 2 shows a vertical cross-section of a retrofittable flue gas treatment chamber, that is, a scrubbing assembly, according to the invention. A flue gas duct 20, which may be of rectangular cross-sectional shape, is inserted between the ends 21 of a conventional cylindrical flue gas exhaust duct. The rectangular duct 20 houses three vertical beds, 1A, 1B and 1C shown in horizontal cross-section.

Funnel-shaped transition duct members 23 joins the rectangular duct section 20 to the circular ends of the conventional flue gas duct 21. Flue gas distribution vanes 24 ensure that flue gas flows evenly through beds 1A, 1B and 1C.

An alkali reagent, typically ammonia, is introduced into the flow stream upstream of the third catalyst bed 1C by a distributor indicated schematically at 40. A fan 42 is provided between the scrubbing assembly according to the invention and the stack 44, to ensure high velocity, turbulent flow of the flue gas through the beds 1A–1C. Complete exposure of the gas, entrained particulates, reactants, etc. in the flue gas stream to the particulates of the beds is thus ensured.

FIG. 3 is an enlarged vertical cross-section through one of the beds 1A, 1B, and 1C, which are of similar structure. Flue gas flow is from left to right in this Figure. FIG. 4 is a cross-section orthogonal to FIG. 3, as indicated at 3—3 of FIG. 4. As shown in FIGS. 3 and 4, a bed 2 of particles is held in upright position on the upstream side by baffles 3 and on the downstream side by a relatively fine screen 4, e.g., of 10–80 mesh. The bed 2 is formed simply by disposing the particulates between the top of the baffles 3 and the screen 4. The bed 2, baffles 3, and screen 4 are temperature controlled by contact with vertical coolant water tubes 5 and 6. These tubes are formed of titanium. Baffles 3 are welded to tubes 5; the screen 4 is confined between the tubes 5 and 6. This stainless steel screen 4 is removable and is snugly held between the two vertical rows of water-cooled tubes 5 and 6, which are spaced about a foot apart in each row. Thus a tube alternately contacts the screen 4 every six inches. This is shown in the horizontal cross-section through the bed of FIG. 4.

In this manner the particle beds can readily be temperature controlled For example, the second bed 1B is controlled to a temperature range of roughly 220–370° F. to condense the sulfuric acid thereon, one molecule of $SO_2$ reacting with one or two molecules of water. This process is carefully regulated by conventional thermostats in the beds controlling cooling water flow valves. In this bed 1B $NO_x$ in the flue gas, together with the elements of the particulates, catalyzes the formation of sulfuric acid as well-known in the art of manufacture of sulfuric acid.

Every cubic inch of flue gas is forced according to this invention to travel through the beds of particulates at high velocity, whereby boundary layers of stagnant gas are removed from the particulates, so that oxidation by $H_2O$, $NO_x$ and $O_2$ in the flue gas is instantaneous. According to this invention, the wire screens themselves, properly prepared, assists in the catalyst function Typically the louvers 3 of each bed are inclined at between about 10 and about 60° to the vertical, and are each between about 1 and about 4 inches wide. The overall thickness of each bed is 1–2 inches.

FIG. 5 is an isometric projection of a vertical cross-section through the base of one of the beds shown in FIGS. 3 and 4. FIG. 6 is a cross-section through the end of the bed and FIG. 7 is an isometric view comparable to but on a smaller scale than FIG. 5, illustrating the overall structure of this bed. A rotating titanium rod 8 with grooves 7 extending along its length is mounted in the base of the bed. The particles fall into the grooves 7 along the entire horizontal width of the bed, and are withdrawn by a strong vacuum applied to the base by way of a lift-pipe 10 illustrated in FIG. 6.

FIG. 7 shows a vacuum drum filter 13, to which the lift-pipe 10 delivers the particles for washing. The drum filter 13 extends over the entire breadth of the bed, which may be on the order of 10 feet wide. Accordingly the lift-tube 10 is curved at the top of the bed, as shown, and is drilled or slotted to become a horizontal vacuum conveyor of particles to the vacuum drum filter 13. A conventional vacuum pump or steam ejector (not shown), is provided as a source of vacuum applied to the interior of the filter drum 13. Water jets 12 wet the surface of the filter and the particulates which are accumulated thereon.

According to an important aspect of the invention, the vacuum force is used in three ways. First, it operates the vacuum drum filter 13, which is conventional in design except that it preferably uses a porous metal or porous fused ceramic for the drum 15. That is, vacuum is applied to the interior of the tube, to pull the particulates onto its porous surface, forming a filter cake. Second, the vacuum force operates the vacuum conveyor system, to withdraw particles from the length of the bottom of the filter bed, lift the particles to the top of the filter bed and distribute them along the length of the of the top of the filter bed. Third, the flue gas drawn through the particles by the vacuum heats the filter cake, and so dries the wetted particles, leaching the absorbed materials from the particulates as fast as they are washed. The acidic filtrate is withdrawn from the interior of the drum in conventional vacuum-drum filtering practice. The lifting and conveying tube 10 may be made of titanium or heavy-wall cast iron pipe, to withstand abrasion as well as acids, since the particles of fly ash may travel at speeds of 5 to 50 feet per second.

A conveyor structure comprising a rotating grooved rod 8 may also be employed at the top of the bed, as shown at 8' in FIG. 7. The particles are distributed evenly throughout the bed by the rotation of the grooved rod 8. The vacuum-drum filter 13 is enclosed by casing 14. As noted, the filter comprises a porous metal or ceramic drum 15 that rotates on hollow shaft 17. Shaft 17 is attached to drum 15 by spokes 16. Vacuum may be applied to the filter and thus to the filter cake 18 of particulates via apertures 19 in the center of tube 17. The conventional drum filter bearings, motor and vacuum pump which may be employed are not illustrated.

To recapitulate, the recirculation of particulates from the bottom of a bed to the top and the leaching of contaminants therefrom is illustrated in FIGS. 5, 6 and 7. The grooved rod 8 at the base of the bed is rotated. Particles drop into grooves 7 in rod 8, and are drawn by vacuum along the breadth of the bed to the lift-tube 10. The particles are distributed over the length of drum filter 13, and are wetted by a series of sprays 12 so that a layer of these particles forms a dense filter cake which adheres to the face of the drum. As the drum rotates clockwise, additional sprays apply moisture which passes inwardly through the particles, leaching the acids and salts resulting from flue gas sorption of contaminates by the particles. The liquid filtrate is recovered from inside the drum in the conventional manner.

Preferably only the aluminous, activated catalyst employed in the third bed according to this invention need be recirculated in an apparatus as shown in FIGS. 5-7. The beds preceding the bed containing the aluminous material contain fly ash or crushed and sized bottom ash, as noted. These can be flow-through-once beds with the gypsum output going to concrete clinker production or concrete byproducts. In this case, conventional vacuum conveying apparatus long used by the power plant industry for conveying fly ash may be employed to extract particles from one end of the base of the beds.

FIG. 8 is a plan view of beds 1B and 1C showing an exemplary manner in which the cooling water tubes 5 and 6 are joined at their bases beneath the screen 4 to unitize the beds structurally as well as cooling it; the structure shown allows the bed to be easily removed from duct 20 for maintenance or replacement. At such time the fine screen 4 can be readily lifted from its snug fit between cooling pipes 5 and 6. The cooling water passed through pipes 5 and 6 may logically be from a boiler plant condenser. Cooling water enters near the top of the bed through vertical pipe 26 feeding horizontal distributing pipe 24 and pipes 27 connecting pipe 24 to the tops of vertical pipes 5. Water flows downwardly through pipes 5 to their bottoms, and thence beneath the screen via horizontal connecting pipes 29 to pipes 6. Water flows thence upwardly to the tops of pipes 6, which are connected via short pipes 30 to a gathering horizontal pipe 25. Preheated feedwater can then be delivered to a boiler from pipe 25 via vertical pipe 28. An offtake from the system delivers water to the spray pipes 12 of the vacuum drum filter 13 shown in FIG. 7, typically at 200 degree F.

Thus FIG. 8 illustrates four novel features. First, the structure shown provides positive cooling of filter bed to condense flue gas acids therein. As noted above, the conventional teaching of the art is to *avoid* cooling the flue gas, to avoid condensation of $H_2SO_4$ in the flue. While this avoids corrosion of the piping of the system, it necessarily causes the release of $H_2SO_4$ mist into the atmosphere, which is a principal source of acid rain. This is avoided according to the invention. Second, FIG. 8 illustrates the manner in which the cooling water tubes provide structural support for the bed, while allowing it to be easily repaired or replaced. Third, FIG. 8 shows means to recover the heat energy lost in cooling the flue gases to condense the acids, by preheating the boiler feedwater. Fourth, FIG. 8 shows means for supplying very hot water needed to leach particulates. As noted, after leaching the particulates can be recirculated and reused.

The preferred activated alumina catalyst used to absorb flue gas contaminates is derived from the skimmings of aluminum melting or holding furnaces. A suitable process for producing this activated alumina is described in U.S. Pat. Nos. 3,955,969 and 4,050,999.

EXAMPLE I

A specific example which will aid in understanding the invention is set forth hereinbelow. This example estimates the gas flows in a 100,000 kw power plant burning Kentucky coal having the following typical composition.

| Coal Ingredient | | Analysis moisture & ash-free | Analysis coal as fired | lbs of each ingredient per lb of coal fired |
|---|---|---|---|---|
| carbon | C | 79.0 | 63.6 | 0.636 |
| hydrogen | H | 5.6 | 4.5 | 0.045 |
| nitrogen | N | 1.7 | 1.4 | 0.014 |
| oxygen | O | 10.1 | 8.1 | 0.081 |
| sulphur | S | 3.6 | 2.9 | 0.029 |
| ash | | | 11.2 | 0.112 |
| water | $H_2O$ | | 8.3 | 0.083 |
| | | 100.0 | 100.0 | 1,000 |

Calculation of consumption of oxygen per lb. coal fired

| Ingredient consumed by oxygen per lb of coal fired in boiler | | Chemical reactions & molecular weights | | | | | lbs of oxygen burned per lb coal | |
|---|---|---|---|---|---|---|---|---|
| carbon | 0.636 | 12 C | + | 32 $O_2$ | → | 44 $CO_2$ | 32/12 = 2.67 | 1.70 |
| hydrogen | 0.045 | 4 $2H_2$ | + | 32 $O_2$ | → | 36 $2H_2O$ | 32/4 = 8 | 0.36 |
| sulphur | 0.029 | 32 S | + | 32 $O_2$ | → | 64 $SO_2$ | 32/32 = 1 | 0.03 |
| | | | | | | | total | 2.09 |
| less oxygen in coal | | | | | | | | 0.08 |
| oxygen required for reactions | | | | | | | | 2.01 |

-continued

| Ingredient consumed by oxygen per lb of coal fired in boiler | Chemical reactions & molecular weights | lbs of oxygen burned per lb coal |
|---|---|---|
| add 24% excess air for complete combustion | | 0.48 |
| total lbs oxygen to boiler/lb coal | | 2.49 |

Calculation of total flue gas per lb. coal fired

| | |
|---|---|
| nitrogen in stack gas above 2.49 × (79/21) (N/O in air) | 9.37 |
| carbon dioxide 0.636 × 44/12 ($CO_2$/C) = 2.33 less $O_2$1.7 | 0.63 |
| water in air needed for combustion including 24% excess over theoretical | |
| 2.49 × (100/21) air/N) × 0.01657 50% humidity 77° F. = | 0.196 |
| water in coal per lb coal fired | 0.083 |
| water from hydrogen combustion 0.045 × (36/4) | .405 |
| | 0.684 0.68 |
| sulphur 0.29 × 64/32 ($SO_2$/S) less $O_2$ = 0.03 | 0.03 |
| total pounds of flue gas per lb coal fired | 13.20 |
| total pounds sulphur dioxide per lb coal fired | 0.058 |
| Percent of sulphur dioxide  0.058/13.20 × 100 = 0.45% in flue gas | |

Calculation of heating value of Coal by Dulong's formula:

Btu per lb of coal = 14,544 × carbon $$62,028 \times \left( \text{hydrogen} - \frac{\text{oxygen}}{8} \right)$$

4050 × sulphur

| | |
|---|---|
| = 14,544 × 0.636 | 9,250 |
| 62,028 × 0.035 | 2,171 |
| 4050 × 0.029 | 117 |
| Btu per lb coal fired | 11,538 |

Calculation of volume of the gas

Assuming a conservative efficiency of 35% for the 100,000 kw plant the Btu converted to kw is 35% × 11,538 × 2,000 = 8,076,600/ton coal.

Since 1 kw power is equivalent to 81,959 Btu/day, the coal needed daily is 100,000 × 81,959/8,076,600 = 1015 tons or 1410 lbs./minute and 23.5 lbs. coal/second.

Since the total lbs flue gas per lb. coal fired is 13.20 (from the above), the lbs flue gas per minute is (1,410 × 13.2 = 18612 and per second 310.2.

Calculation of mols. of gas and volumes at elevated temperatures (based on one mol. of any gas occupying 359 cu. ft. at 32° F.)

| | | | | volume in cu ft of gas/lb coal | | | |
|---|---|---|---|---|---|---|---|
| Gas | lbs/lb coal fired | mol weight | mols of gas | 32° F. 459R | 212° F. 672R | 400° F. 860R | 600° F. 1060R |
| $N_2$ | 9.37 | 28 | 0.355 | 120 | 175 | 225 | 277 |
| $CO_2$ | 2.33 | 44 | 0.053 | 19 | 28 | 36 | 44 |
| $O_2$ | 0.48 | 32 | 0.015 | 5 | 7 | 9 | 12 |
| $H_2O$ | 0.68 | 18 | 0.038 | 24 | 20 | 26 | 32 |
| | 12.86 | Ave 29 | 0.441 | | | | |
| flue gas volumes per lb. coal | | | | 158 | 230 | 296 | 365 |
| and at 23.5 lb coal/sec the cu. ft flue gas/sec is: | | | | 3,713 | 5,405 | 6,956 | 8,578 | pilot plant test indicates gas through cascade of activated alumina travels 40 ft/sec so area required is volume/40. At a reaction temperature of 400° F. = 174 ft.$^2$
Hence a 13 × 13 ft square duct will provide adequate reaction area.

Calculation of Savings Due to Preheating of Boiler Feedwater

From the data of Example I of this Specification the saving is calculated as follows:

boiler feedwater is heated as flue gas cools 100° F, from 350° to 250°.

average specific heat of flue gas at average 300° F is 0.254 Btu/lb. flue gas 12.86 lbs. flue gas/lb. coal fired from above Calculation of mols of gas and volume at elv. temp.

100 × 0.254 × 12.86 = 326 Btu saved per lb. coal with 11,538 Btu available/lb. coal fired = 326/11,538 = 2.82%. If coal costs $30/ton delivered the saving is $0.85 per ton coal fired or per day $0.85 × 1015 tons/day = $862/day Although the foregoing specification refers generally to treatment of flue gases from coal-fired power plants, it should be understood that the apparatus and process of the invention is suitable for treating practically any type of flue gas whether generated by burning oil, natural gas, or waste dump materials, or from mineral smelting or paper manufacturing operations.

While a preferred embodiment of the invention has been disclosed, those of skill in the art will recognize that other modifications and improvements can be made thereto without departure from its spirit and scope. The invention is therefore not to be limited by the above disclosure, but only by the following claims.

We claim:

1. An article of manufacture for removing $SO_2$, $NO_x$ and other pollutants from a flue gas stream containing these pollutants, comprising:

a horizontal housing defining a duct for flow of flue gas therethrough;

at least three vertical beds of particulates disposed in succession transversely in said duct, whereby said flue gas flows in succession through each of said beds;

means for supplying a particulate material for removing entrained fly ash from said flue gas stream to a first one of said beds;

means for supplying a particulate material for removing sulfuric acid from said flue gas stream to a second one of said beds;

a third one of said beds comprising a regenerable particulate catalyst for carrying an alkali reactant thereon for reacting with sulfur dioxide in said flue stream;

means for injecting an alkali material into said flue gas stream upstream of said third bed; and means for inducing high velocity turbulent flow of said flue gas through said at least three beds.

2. The article of manufacture of claim 1 wherein the particulate of one of the first and second beds is formed of ash and slag materials from combustion of coal which do not form fly ash.

3. The article of claim 2 wherein said slag and ash materials are sized prior to disposition in said bed.

4. The article of manufacture of claim 1 wherein said particulate sin each of said bed are confined in a layer between a screen on one side and a succession of inclined panels on the other, wherein said inclined panels are disposed on the upstream side of the particulates and the screen is disposed on the downstream side of the particulates.

5. The article of claim 4 in combination means for removing particulates from the bottom of the beds.

6. The article of manufacture of claim 5 in combination with means for recycling said particulates to the top of said beds after removal from the bottom thereof.

7. The article of manufacture of claim 1 wherein the particulates in the first and second beds are formed of a material which combines with lime in fly ash and sulfuric acid to form gypsum.

8. The article of manufacture of claim 7 wherein said catalyst is an activated aluminous material.

9. The article of manufacture of claim 8 wherein said activated aluminous material is skimmed from molten aluminum in an aluminum melting furnace.

10. The article of manufacture of claim 9, further comprising means for injecting gaseous ammonia into the flue gas stream between the second and third beds.

11. The article of manufacture of claim 10 in combination with filter means for recovering the aluminous catalyst from the process stream after removal of the sulphur dioxide from the flue gas stream.

12. The article of manufacture of claim 1 wherein said catalyst is selected from the group of materials consisting of aluminous materials, carbonaceous materials, clay, diatomaceous earth, Fuller's earth, and activated silica.

13. The article of manufacture of claim 1 wherein at least one of said beds comprises means for temperature control thereof, to induce removal of said contaminants from said flue gas stream by said particulates of said bed.

14. The article of manufacture of claim 13 wherein cooling water is supplied to said at least one bed by passage through piping which is in thermal contact with said screen, whereby said piping additionally serves to assist in maintaining the structural integrity of the bed.

15. The bed of claim 14 where the material of said piping is titanium.

16. The article of manufacture of claim 1 wherein the typical thickness of each said bed is between 1 and 2 inches.

17. The article of manufacture of claim 1, further comprising means for controlling the temperature of at least one of said beds to a temperature below the condensation temperature of sulfuric acid.

18. The article of manufacture of claim 1, further comprising means for removing, regenerating and reusing said particulate catalyst.

19. The article of manufacture of claim 1, further comprising heat exchanger means disposed in said duct upstream of said beds to recover heat from said flue gas stream and to cool it to a temperature low enough to encourage condensation of sulfuric acid on said beds.

20. The article of manufacture of claim 1, wherein said alkali material is ammonia injected into said flue gas stream between said second and third beds.

21. As an article of manufacture, a scrubber assembly for use in connection with flue gas streams from power plants containing sulphur dioxide, comprising:

a first vertical bed of particulates disposed in horizontal duct means such that said flue gas passes substantially entirely through said first bed, said first bed comprising a particulate material which reacts with fly ash in said flue gas stream to remove said fly ash therefrom;

a second vertical bed disposed downstream from said first bed in said duct means, such that all of said flue gas must pass therethrough, and comprising a bed of a particulate material selected to remove sulphur dioxide from said flue gas stream as sulfuric acid; and a third vertical bed disposed downstream of said first and second beds in said duct means such that said flue gas stream passes substantially entirely therethrough, said third bed comprising particulates of a catalyst material for removing unreacted sulphur dioxide from said flue gas stream.

22. The article of manufacture of claim 22 wherein said means for recycling the particulates comprises means for physically moving said particulates from the bottom of said bed to regeneration means and thence to the top of said bed.

23. The article of manufacture of claim 21 wherein said beds are generally rectangular in shape and are disposed in a duct which is rectangular in cross-sectional shape in the vicinity of the location of said beds and which comprises tapering duct means for mating said rectangular section of said duct with ends of a preexisting flue gas duct in a power plant, for ready retrofitting of said scrubber thereto.

24. The article of manufacture of claim 21 further comprising means for introducing gaseous ammonia into said flue gas stream prior to said third bed, whereby said particulates catalyze the reaction between said ammonia and said sulphur dioxide, whereby said sulphur dioxide is substantially removed from said flue as stream.

25. The article of manufacture of claim 24, wherein said catalyst is selected from the group consisting of activated aluminous materials, carbonaceous materials, clay, diatomaceous earth materials, Fuller's earth, and activated silica.

26. The article of manufacture of claim 21 wherein at least said third bed comprises means for recirculating particulates after employment to remove unwanted contaminants from said flue gas stream.

27. The article of manufacture of claim 26 wherein said means for regenerating the particulates comprises filter means for forming a filter cake of said particulates and for allowing a leaching solvent to be passed through the filter cake of particulates, whereby the contaminants are removed from the particulates.

28. The article of manufacture of claim 27 wherein said particulates are confined in said beds between a screen on the downstream sides of said beds and horizontal louvers on the upstream side of said beds, whereby said flue gases enter said beds between said louvers and exit the beds through the screen.

29. The article of manufacture of claim 28, wherein said beds include means for temperature control thereof, such that the pollutant-removal reactions therein are encouraged.

30. The article of manufacture of claim 29 wherein said temperature is controlled in at least said first and second beds to be below the condensation temperature of sulfuric acid, whereby sulfuric acid is condensed in said beds and may be removed therefrom.

31. The article of manufacture of claim 29 wherein said beds are water cooled by means of water cooling pipes in thermal contact with and affixed to said screen, whereby said pipes support said screen and maintain the structural integrity of said bed.

32. The article of manufacture of claim 31 wherein said pipes are formed of titanium material.

33. The article of manufacture of claim 31 wherein said cooling water is employed as boiler feedwater after having been heated in said beds.

* * * * *